March 14, 1933.  C. F. HIGH  1,901,448
INTERNAL COMBUSTION ENGINE
Filed June 5, 1929   5 Sheets-Sheet 4

Inventor
C. F. High
By Young & Young
Attorneys

Patented Mar. 14, 1933

1,901,448

UNITED STATES PATENT OFFICE

CARL F. HIGH, OF MADISON, WISCONSIN

INTERNAL COMBUSTION ENGINE

Application filed June 5, 1929. Serial No. 368,572.

This invention relates to internal combustion engines, and more particularly to two stroke cycle engines.

Serious objection to present types of two stroke cycle engines resides in their lack of efficiency resulting either from loss of fuel caused by over-scavenging, or loss of power due to under-scavenging, or both improper scavenging and loss of fuel.

The present invention has primarily for its object to overcome the foregoing defects by the provision of a two stroke cycle engine in which the scavenging fluid and fuel charge are so introduced into the cylinder as to cause complete scavenging, with substantially no loss of fuel.

Incidental to the foregoing, a more specific object resides in the provision of simple and efficient means for controlling the path of travel of the scavenging fluid and fuel charge introduced into the cylinder, and timing the period of fuelization of the air for combustion, whereby the residual gases of combustion are most effectively forced from the cylinder and possible loss of fuel reduced to a minimum.

A more specific object resides in so introducing the scavenging fluid and fuel charge into the cylinder under pressure as to cause the same to follow a helical path up the pore of the cylinder to the head, where it is deflected or expanded toward the center of the cylinder, and thence travels downwardly to completely force the residual gases of combustion from the cylinder exhaust port.

A further object resides in so timing the period of fuelization of the air charge, that the initial charge of air which effects the scavenging operation, is not fuelized, thus eliminating possibility of loss of fuel through the exhaust port, and bringing about the most desirable gradation or stratification of the combustible charge within the cylinder.

While the best results are to be obtained by combining what may be termed "helical induction" of the scavenging fluid and the combustible charge, with the timing of the period of fuelization, distinct advantages are to be obtained by the independent use of either of these features, as will be apparent from the following description and explanation.

A further object resides in the novel construction of the piston head for directing the path of travel of the scavenging fluid and the fuelized charge as heretofore set forth.

Other objects of this invention reside in the provision of an improved mechanical structure for producing maximum forced agitation or turbulence of the fuelized charge, and the most desirable gradation of the charge for maximum efficiency of combustion.

A still further object is to provide a structure in which the path of travel of the fresh charge is so directed as to cool the cylinder wall adjacent the edges of the exhaust ports to prevent their burning out, and thereafter absorb heat from the cylinder wall to prevent its overheating and provide thorough vaporization of the fuel.

Numerous other objects include the many advantages which will appear from time to time as the description proceeds.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Referring now more particularly to the accompanying drawings, the engine illustrated and to be described in more or less detail, is of the radial type, particularly designed for use in connection with aeroplanes. It will, however, be understood that the principles of the invention are readily applicable to any arrangement of cylinders, although the present design of engine presents various structural features of particular advantage, as will appear more fully from the following description.

In the drawings, the numeral 1 designates a conventional crank-case comprising front and rear sections 2 and 3, respectively, which sections are secured together by a plurality of transverse bolts 4 provided with threaded extensions 5 which may serve to attach the motor to any suitable support, not shown. Secured to the periphery of the crank-case 1, at spaced intervals, are a plurality of combustion cylinders 6 in which are mounted reciprocative pistons 7. The combustion cylinders are provided with heads 7'.

Figure 1:
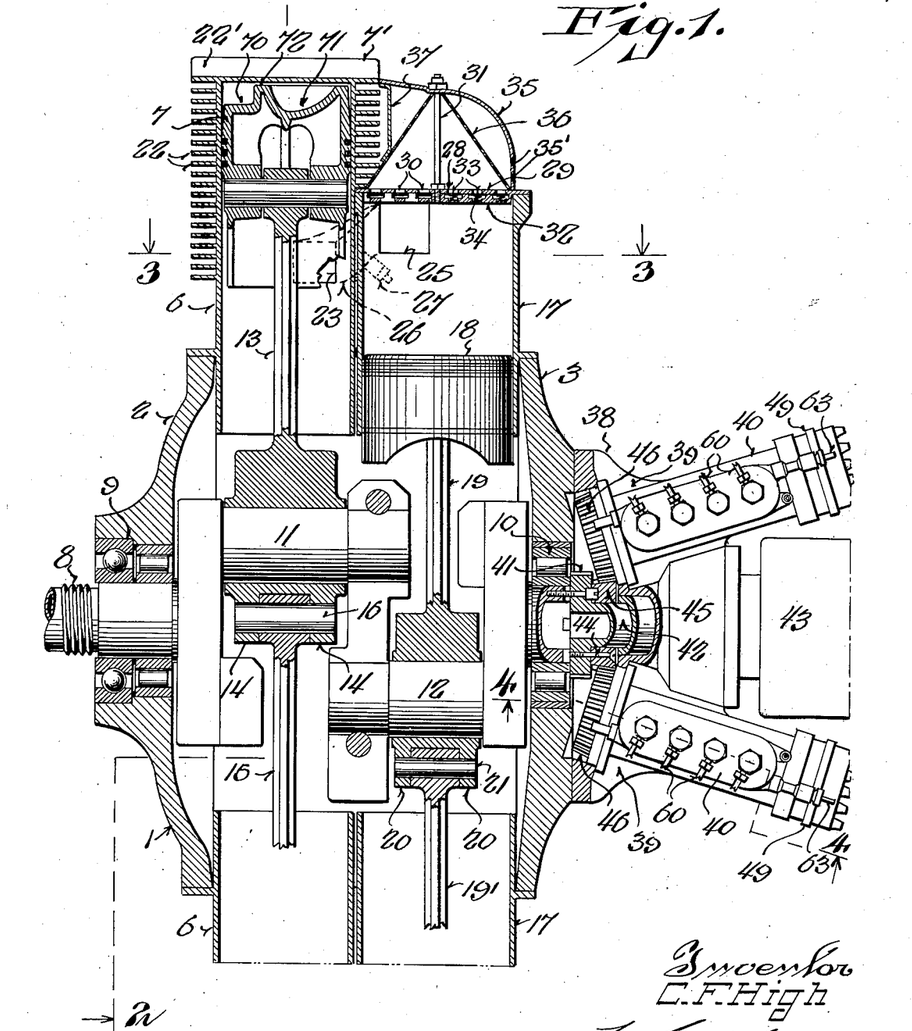
Figure 1 is a vertical longitudinal section through an engine constructed in accordance with one form of the present invention, the same being taken on the line 1—1 of Figure 2.
Figure 2:
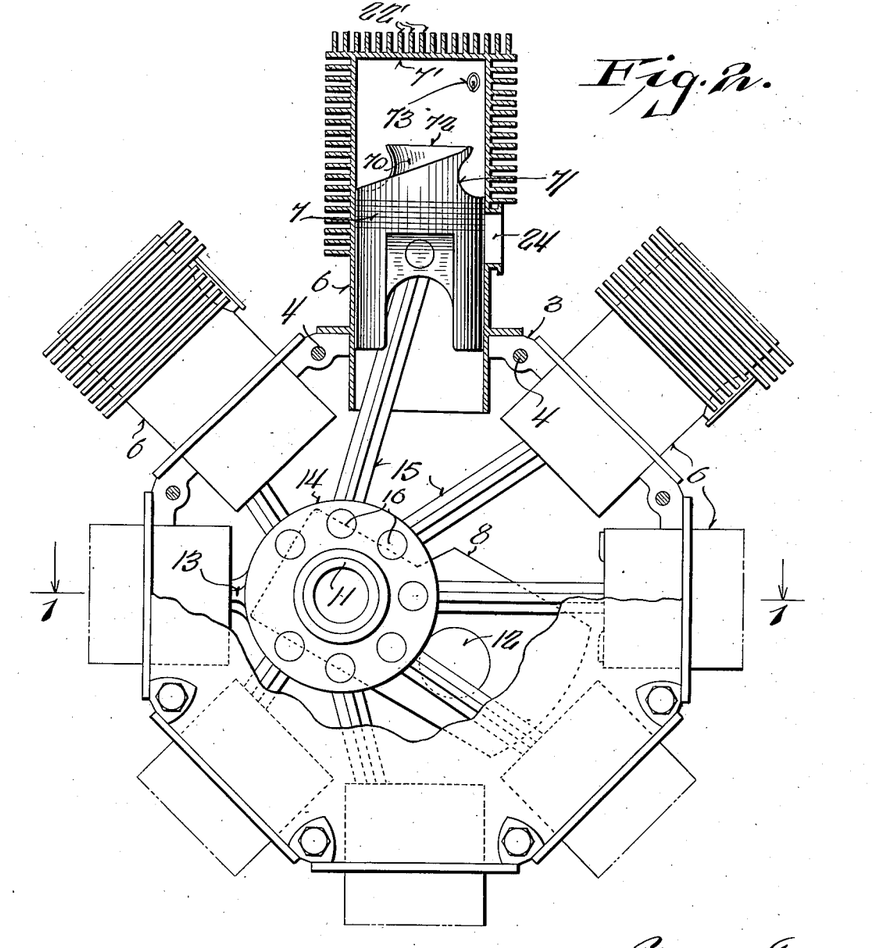
Figure 2 is a transverse section taken on the line 2—2 of Figure 1.

A crank shaft 8 is journalled in antifrictional bearings 9 and 10 provided in the front and rear sections, respectively, of the crankcase, and as best shown in Figure 1, the crank shaft is provided with a pair of cranks 11 and 12, the former being connected with the reciprocative pistons 7, while the latter serves to actuate displacement pistons, as will be hereinafter described.

The combustion pistons 7 are connected with the crank 11 in the usual manner of engines of the radial type, one of the pistons being provided with a master connecting rod 13 which is either formed integral or rigidly connected with the crank shaft rings 14. The remaining pistons are provided with connecting rods 15 journalled on the pins 16, carried by the crank shaft rings at suitably spaced intervals.

Formed integral with the combustion cylinders 6 and disposed in longitudinal alignment therewith are a corresponding number of displacement cylinders 17 provided with displacement pistons 18, connected with the crank 12 in a similar manner to the combustion pistons, through a master connecting rod 19, which carries the crank shaft rings 20 to which the remaining connecting rods 19' are connected by means of spaced pins 21.

While the combustion chambers may be of any conventional design for either water or air cooling, the form illustrated provides annular cylinder fins 22 and head fins 22' for air cooling, as in engines of the radial type, this form of cooling provides the cheapest and lightest construction and the most efficient operation.

As in conventional two-stroke cycle type engines, the cylinders 6 are provided with intake ports 23 and exhaust ports 24 spaced at opposite sides of the cylinders, the exhaust ports being of greater area than the intake ports to facilitate scavenging and exhausting of the products of combustion, the intake ports being confined to a limited area to increase the velocity of the incoming charge.

Here it will be noted (Figure 8) that the upper edges of the exhaust ports 24 are inclined upwardly from a point in the same plane as the top edge of the intake port 23, thus effecting gradual opening and closing of the exhaust ports from one side to the other. Obviously, as the piston travels downwardly, the exhaust ports are partially opened prior to initial opening of the intake port, thus producing exhaust through the ports from one side to the other prior to opening the intake port, which action starts a whirl of residual gases within the cylinder prior to introducing the scavenging fluid, thus assisting in the helical induction of the scavenging fluid around the bore.

Figure 8:
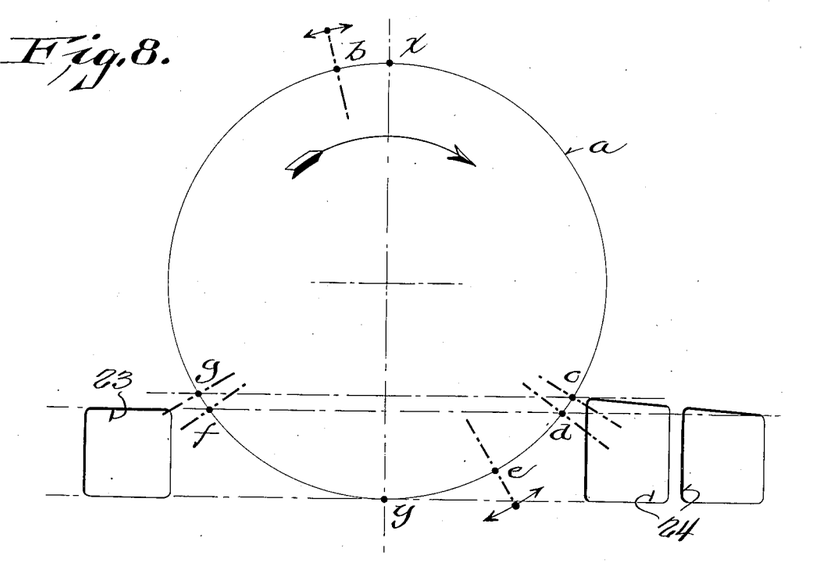
Figure 8 is a diagram illustrating the cycle of operation.

As best shown in Figure 8, the upper edges of the exhaust ports are slightly inclined to provide a gradual opening of the same from the leading side to the rear, as the combustion pistons by-pass the same. The purpose and result of this feature will be described in further detail in connection with the operation of the engine.

Figure 3:
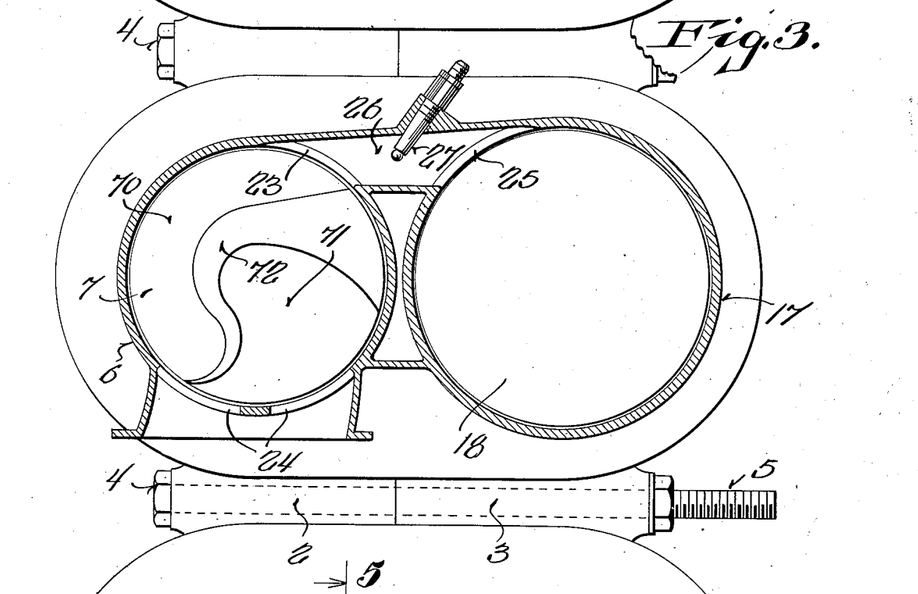
Figure 3 is a detail plan section through one of the cylinders, taken on the line 3—3 of Figure 1.

As best shown in Figure 1, the displacement cylinders 17 are provided with outlet ports 25 adjacent their upper ends, and these ports communicate with the inlet ports 23, in the combustion cylinders, through the ducts 26 that engage the combustion cylinders tangentially adjacent the inlet ports, as best shown in Figure 3. A fuel injection nozzle 27 communicates with each of the ducts or passages 26 to fuelize the air which is forced into the combustion cylinder from the displacement cylinder, prior to its entering the combustion chamber.

The upper ends of the displacement cylinders have secured thereon, intake valves 28, each of which comprises an intake plate 29 provided with suitable openings 30. Secured to the underside of the intake plate 29 by means of the stud 31, carried by the intake plate, is a valve cage 32 which houses a plurality of annular valve discs 33 which normally close the openings 30 provided in the plate 29. The valve discs 33 are normally held in closed position by a plurality of compression springs 34 disposed between the valves and seats provided in the valve cage 32. Thus, as air is drawn into the displacement cylinder, upon downward movement of the piston 18, the valve discs will open against the spring tension exerted thereon and will promptly seat upon the reverse movement of the piston, causing the fluid in the displacement chamber to be forced through the outlet port 25, the duct 26, and thence into the combustion cylinder. Obviously, any other type of inlet valve may be employed without affecting the principle of operation of the engine.

Mounted above the inlet valves 28 and opening toward the combustion cylinders are the hoods 35 which serve to collect and direct air from around the combustion cylinders to the displacement cylinder. Each of the hoods 35 is provided with a conical perforated apron 36 and a baffle plate 37 disposed between the apron and the hood to direct the air in an annular path around the apron. Obviously, the air will then be drawn in through the perforated apron while the centrifugal force resulting, will cause heavy particles of dirt and foreign matter to be thrown into contact with the hood and discharged through the openings 35' provided therein. As the description proceeds, it will be apparent that any form or shape of hood may be employed for collecting and directing air into the displacement cylinder without affecting the mode of operation of the engine.

Secured to the rear section of the crankcase 3 is a housing 38 which encloses the driving connections for the fuel injection pumps and the usual generator and starting motor. As best shown in Figure 1, the housing 38 is provided with a pair of offset brackets 39 upon which are mounted the casings 40, each of which encloses a set of fuel injection pumps to be further described in detail.

Inasmuch as the particular types of generator and starter employed form no specific part of the present invention, a detailed description and illustration of the same will be avoided.

The rear end of the crank shaft 8, which is journalled in the bearing 10, has secured thereto a spur gear 41 which meshes with suitable gearing (not shown) to drive the generator and any other desired mechanism, such as the lubricating system, and as indicated in Figure 1, the gear 41 may be provided with a hub extension 42 adapted to form a connection with the starting motor 43, in any conventional manner.

Mounted on the hub 42 and secured to the gear 41 by means of screws 44, is a bevel gear 45 which meshes with the bevel gears 46 carried by the cam shafts 47, which actuate the fuel injection plungers by means of the cams 48.

Figure 4:
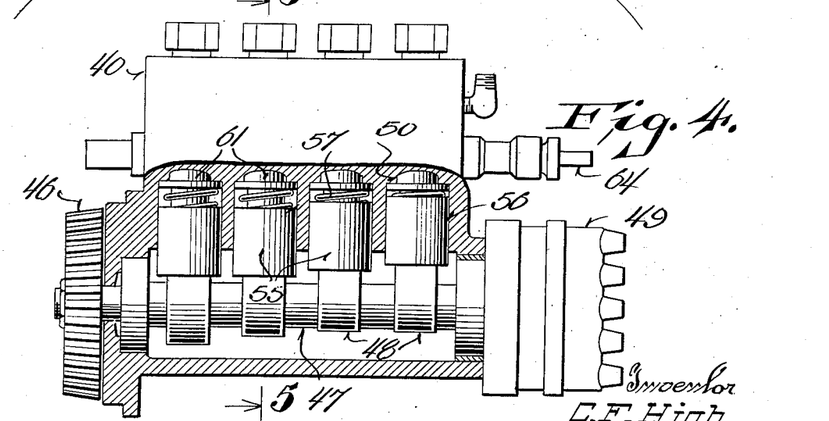
Figure 4 is a longitudinal section through one set of the fuel injector pumps, the same being taken on the line 4—4 of Figure 1.

As best shown in Figure 4, the cam shafts 47 are journalled in the pump casings 40 and may be connected at their rear ends with the conventional distributors 49 carrier by the casings 40, although it is immaterial in the present invention, as to the method of actuating the ignition mechanism.

While it will be appreciated that any form of fuel injection pump may be utilized for fuelizing the combustible charge, that form illustrated offers a compact, efficient structure in which the period of fuel injection may be varied to a minute degree.

Figure 5:
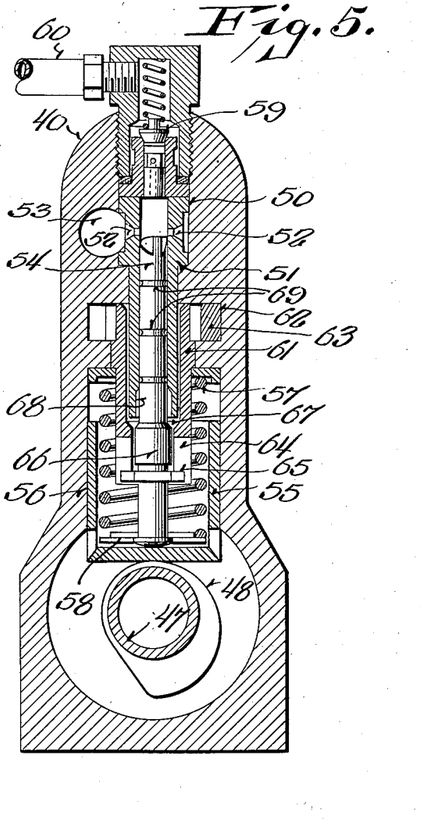
Figure 5 is a transverse section taken on the line 5—5 of Figure 4.

Inasmuch as the individual plungers provided for each cylinder are similar, the description will be confined to a single pump, as illustrated in Figure 5, wherein the case 40 is shown as provided with a plurality of vertical bores 50, each having mounted therein a stationary bushing 51 provided with inlet ports 52 communicating with a common fuel supply passage 53. Reciprocatively mounted within the bushing 51 is a plunger 54, the lower end of which engages a sleeve 55, slidably mounted within the recess 56 provided in the casing 40. The sleeve 55 is urged into engagement with its actuating cam by a coiled spring 57 disposed within the sleeve 55 and engaging a head 58 carried by the lower end of the plunger 54.

From the foregoing, it will be readily seen that reciprocative movement of the sleeve 58 will be imparted to the plunger 54, which in its lowermost position, as illustrated in Figure 5, permits fuel from the chamber 53 to enter the bore of the bushing 51 through the inlet ports 52. Upon the upward movement of the plunger 54, the inlet ports 52 are first cut off and the remaining fuel is then forced past the check valve 59 and thence through the fuel supply pipe 60 to its corresponding fuel injection nozzle 27.

It will be noted that the head of the plunger 54 is mutilated to provide inclined surfaces which, by rotating the plunger, will vary the time of cutting off the inlet ports 52 and, therefore, the period of fuel injection. This structure is conventional and, therefore, as previously stated, forms no specific part of the present invention, as any means may be employed for regulating the period of fuel injection.

In order to rotate the plunger 54 for the purpose of regulating the period of fuel injection, a sleeve 61 is journalled within each of the vertical bores of the casing 40 and surrounds the bushing 51 in the lower portion of the plunger 54. Adjacent the upper end of the sleeve 61 the casing 40 is provided with an enlarged recess 62 and the sleeve 61 is provided with radial teeth projecting into the recess and engaged by a rack bar 63, reciprocatively mounted within the recess 62. The end of the rack bar 63 projects beyond the casing 40, as shown in Figures 1 and 4, and may be provided with any suitable means for manipulating the same. The lower end of the sleeve 61, which surrounds the plunger 54, is provided with vertical slots 64 which engage the radial projections 65 carried by the plunger.

Thus, it will be seen that the plunger is free to reciprocate vertically within the sleeve 61, and upon rotation of the latter through means of the rack bar 63 the plunger 54 will be rotated to regulate the cut off of the intake ports 52.

To provide for suitable lubrication of the plungers 54 and their actuating mechanism, it is proposed to introduce lubricant into the enlarged recess 62, from which the same will feed downwardly between the sleeve 61 and the bushing 51, and thence on downwardly through the sleeve 55 to the cams 48. As will best be seen in Figure 5, that portion of the plunger 54 disposed within the lower end of the sleeve 61 is provided with an annular enlargement 66 which cooperates with the sleeve 61 to form a well or recess 67. Also, the lower end of the bushing 51 is provided with an internal annular recess 68 for reception of the enlarged portion 66 of the plunger. Thus, as the plunger is forced upwardly, the enlarged portion 66 will carry a portion of the lubricant accumulated within the well 67, into the bushing 51, where it will be forced upwardly by the close tolerance provided and progressively picked up by the annular grooves 69 formed in the plunger to create a film around the plunger extending its full length and sealing any clearance between the plunger and bushing to prevent the downward escape of fuel.

Thus far the description has been directed to general structural features which may be modified or altered in several ways to accomplish the purpose of the invention. For instance, it is old in connection with two-stroke cycle engines to utilize forced scavenging and pressure spray carburetion. Therefore, various devices may be employed for accomplishing these operations. However, as pointed out in the objects, the present invention consists primarily in the novel operation and results obtained, which fundamentally are due to the construction of the piston employed, and the relative timing of the various operations included in the cycle. In this connection, the piston structure will be considered first.

Figure 6:
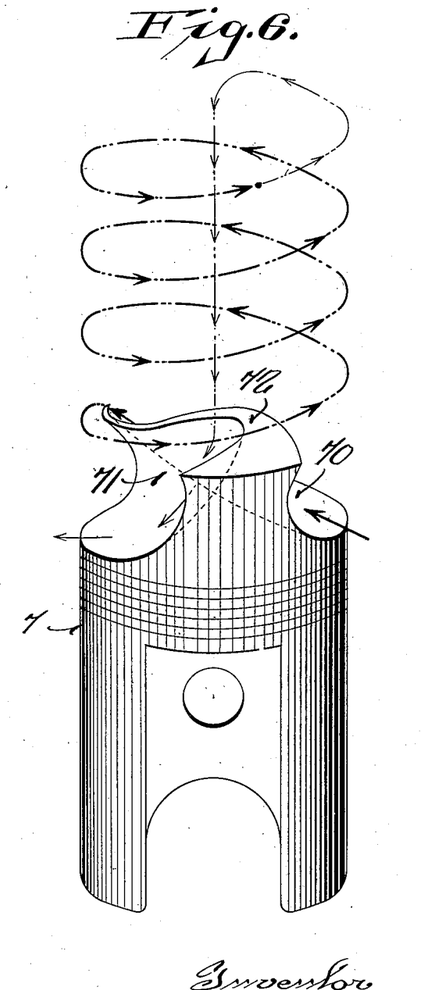
Figure 6 is a perspective view of one of the pistons, illustrating diagrammatically the method of induction of the scavenging fluid and combustible charge.
Figure 7:
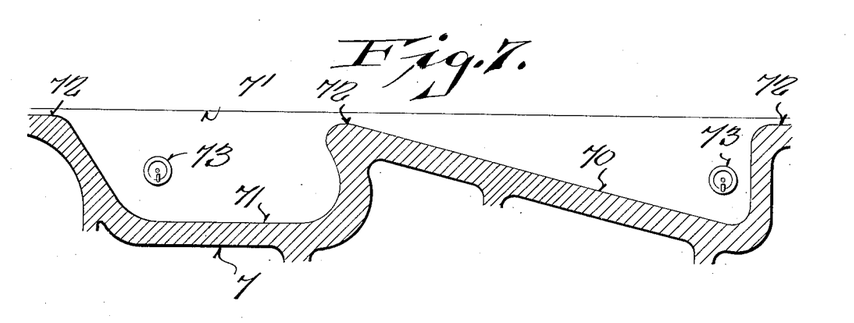
Figure 7 is a view illustrating diagrammatically the combustion chambers in an unfolded section.

As best shown in Figures 3 and 6, the head of the piston 7 is provided with a peripheral trough or channel 70 forming a section of a helix, the lower end of which starts adjacent the intake port, while the upper end terminates adjacent the forward edge of the exhaust ports 24.

Between the respective ends of the helical trough 70, the piston head is provided with a central inclined depression 71 which is flared outwardly and downwardly to the width of the exhaust ports, the lower edges of both the helical trough 70 and the depression 71 terminating upon the same horizontal plane.

From the foregoing, it will be quite obvious that fluid forced into the combustion cylinder enters the intake ports tangentially to the cylinder and then travels up the helical trough 70, which directs the fluid over the top of the exhaust ports and into a helical path up the walls of the cylinder to the head, where it is deflected or expanded from all sides towards the center of the cylinder. The fluid is then forced down the vertex or axial core of the helical column of fluid, to the head of the piston where it enters the central depression 71 and is directed outwardly through the exhaust ports.

The provision of the helical trough 70, surrounding the central depression 71 and the piston head, results in a projection 72 of substantially an ogee contour, as will best be noted in Figure 3. Thus, as the piston reaches the extreme end of its compression stroke, the combustion chamber is practically divided into two compartments, the purpose and advantages of which will be discussed more fully in connection with the operation of the engine.

While various arbitrary arrangements of ignition plugs may be employed for igniting the combustible charge, the best results are obtained by utilizing two spark plugs 73, positioned within the cylinder upon opposite sides of the piston projection 72 where each plug ignites the charge contained in one of the combustion compartments formed by the piston head.

In discussing the operation of the present invention, particular reference is to be had to the diagram comprising Figure 8, which illustrates the cycle of operation and indicates the period of scavenging, fuelization, compression, ignition, and expansion.

In the diagram, a complete cycle of operation is indicated by the circle "$a$", while the intake ports and exhaust ports are shown in their relative position to each other and the stroke of the piston. The various operations are indicated successively in clockwise direction on the circle "$a$".

The points $x$ and $y$ indicate, respectively, the upper and lower limits of the piston stroke. As is customary in all internal combustion engines, ignition of the combustible charge takes place just prior to completion of the upward or compression stroke of the piston and is indicated by "$b$". From the point "$b$" to the point "$c$", expansion takes place, and at the point "$c$", the piston starts to open the leading edge of the exhaust ports, which extends slightly above the top of the intake port and the rear edge of the exhaust ports, as indicated.

Therefore, as the piston travels from the point "c" to the point "d", a gradual opening of the exhaust port takes place from its forward edge to its rear edge, which starts exhaust of the burnt gases at the leading corner of the ports and advances along the inclined top of the port, thus progressively exhausting around the axis of the cylinder and imparting a whirling movement of the residual gases prior to opening of the intake port, which takes place at the point "d", by which time the pressure within the cylinder has been reduced to approximately one atmosphere. At the point "d", the intake port is opened and the operation of the displacement cylinder is so timed that the scavenging fluid, which has been slightly compressed prior to opening of the intake port, is forced into the cylinder in a direction which augments the whirling movement of the residual gases imparted by the progressive opening of the exhaust ports.

As previously explained, the scavenging fluid is directed into a helical path by the trough 70 formed in the piston head and as fluid travels up the walls of the cylinder, the residual gases are forced to the center. The scavenging charge continues to the head of the cylinder and then either expands or is deflected inwardly towards the center. The closely coiled helical mass of fluid, aided by the cylinder head, is then deflected or rolled into a smaller helix, which is forced down the vertex or axial core of the outside helix to the central depression 71 formed in the piston head.

During this period, the residual gases, to which a whirling motion has been imparted by the progressive openings of the exhaust ports in the manner described, have been completely forced from the cylinder by the fresh incoming air and having augmented helical induction of the incoming fluid, such action continues until the intake port is closed upon the upward stroke of the piston, which is indicated in the diagram by the point "f". However, starting at the opening of the intake port, only the first portion of air is utilized for scavenging or forcing the residual gases from the cylinder. To obtain the maximum charge and greatest efficiency, injection of fuel starts at the critical point "e", at which point the previous charge of air is sufficient to effect complete scavenging. However, this point is variable, depending entirely upon the amount of charge desired.

Starting at the point "e", the induction of fuel into the air stream continues to the point "f", at which the intake port is cut off by the piston. Starting at "f" and terminating at "g", the triangular upper portion of the exhaust port is cut off, and from the point "g", to the limit of piston travel, compression takes place.

From the foregoing, it is believed that the operation of the present invention will be clearly understood and, therefore, the various advantages and novel results derived from such operation will be discussed in further detail.

In connection with helical induction of the scavenging fluid, it is thought that the advantages are readily apparent from the foregoing explanation, in that complete scavenging is effected, with resulting cooling of the upper edges of the exhaust ports and absorption of heat from the cylinder walls through contact with the cool air supply. However, the continued helical induction of the fuelized charge presents other advantages which may not be as readily apparent.

Chiefly amongst these is the thorough vaporization of the fuel and the proper mixing of the combustible charge, resulting from the turbulence imparted to the charge as it travels an extended helical path in immediate contact with the walls of the cylinder from which it absorbs heat essential to thorough vaporization.

In addition to the foregoing, helical induction of the fuelized air results in a supercharge of the cylinder, due to the fact that the fuelized air is forced into the cylinder at a high velocity tangent to the bore, the direction imparted by the helical channel in the piston head augmenting the direction of rotation already set up by the discharging exhaust, causing the charge to flow up the bore of the cylinder at a high velocity, resulting in a high kinetic energy of flow which not only plows the residual gas of the former cycle from the bore, but also fills the volume displaced with its flowing cylindrical mass. This mass is necessarily concentrated while its internal pressure is low for the reason that its kinetic energy of flow has not resolved itself into the static pressure which it assumes when coming to rest, as the piston cuts off the exhaust ports.

Considering next the manner of fuelizing the combustible charge wherein an air stream of greater length than the helical distance up the cylinder bore and down the vertex to the exhaust port is forced into the cylinder, the first portion of the air stream which has travelled the helical path and serves as the scavenging agent, is not fuelized. Then as fuelization commences a gradation of the charge takes place as the fuel strength gradually increases until a substantially correct proportionate mixture exists in that portion of the stream, which eventually comes in contact with the ignition plugs. When ignition occurs under these conditions, the flame advance, even though it may have the characteristics of a detonation wave, due to the increased pressure and temperature, will burn all of the fuel in the more lean portion of the mixture and will at the same time gradually damp itself and lose its velocity, resulting in complete combustion and eliminating detonation. Also, if an over rich mixture exists, it will burn gradually to carbon-monoxide, which when later mixed with air by the turbulence created, will burn to carbon-dioxide, in the characteristic manner of two stage combustion. That such stratification occurs, is conclusive from the fact that the incoming charge flows at a high velocity in a definite non-conflicting path. In other words, there is no inter-mixing of gases between various sections of the helical column, due to its non-crossing or uninterrupted path. This action, which renders possible fuelization of any portion of the charge, insures the correct location of the fuelized charge for instantaneous ignition by the plugs.

Although efficient scavenging is usually conceded the paramount problem of two stroke cycle engines, it is essential that governing be considered, because of its close relation and influence upon scavenging, and in this connection, the advantages of qualitative governing, as provided for by the present invention, will be self-evident.

The present invention provides for the maximum compression which remains constant, while governing is obtained by varying the period of fuelization. This is made possible by the fact that the fuelized portion of the air stream remains isolated from the residual gases and from the unfuelized air stream, which effects the scavenging operation.

Aside from the advantages resulting from the helical induction imparted to the scavenging fluid from the fuelized air charge by the peculiar construction of the piston head, the latter is of particular significance as effecting combustion. It is self-evident that the irregular contour of the projection of the piston head between the helical channel and central depression will impart mechanical mixing or turbulence to the combustible charge, in that as the same closely approaches the head of the cylinder at the period of ignition, it serves to gradually plow the charge apart into substantially two combustion compartments. In this action, the charge is forced past the spark plugs where it is ignited, or should ignition have occurred, the flame is broken up or distributed. Also, projection of the flame fronts by the contour of the piston head, causes them to overlap, and change what would otherwise be detonation waves, into mere rotation of the burning charge.

The action or waves thus imparted to the ignited charge continue into any possible stagnant areas or pockets, thus increasing the rate and completeness of combustion.

Upon expansion, the direction of the turbulence is reversed, which results in the gases rolling back to fill the void evacuated by the projection of the piston head, causing the thin layer of chilled gas trapped between the projection of the piston head and the cylinder, or in the wall clearance space of the piston, to be swept into the burning charge and consumed.

While helical induction of the scavenging fluid and combustible charge, together with variable fuelization of the combustible charge under constant pressure, have been discussed in considerable detail as affecting one another, it is self-evident that either feature in itself has distinct advantages, and while the best results are obtained by combining these features, the invention is not to be so limited.

From the foregoing explanation considered in connection with the accompanied drawings, it will be readily seen that an exceedingly simple and efficient two stroke cycle engine has been provided in which complete scavenging without loss of fuel, and maximum efficiency of combustion is obtained.

I claim:

1. In an internal combustion engine of the two stroke cycle type, a piston provided with a helical channel surrounding approximately one-half of its periphery, and a central pocket having communication with an adjacent portion of its periphery.

2. In an internal combustion engine of the two stroke cycle type, a piston provided with a peripheral channel of helical contour, and a central pocket inclined downwardly and outwardly toward the periphery of the piston, the lower edges of said channel and said depression being substantially in the same horizontal plane.

3. An internal combustion engine of the two stroke cycle type comprising a cylinder provided with opposed inlet and outlet ports, a reciprocative piston mounted within said cylinder and controlling said ports, means for introducing fluid through said inlet port, means carried by said piston head for directing said fluid in an upward helical path adjacent the walls of the cylinders and above said exhaust port, and means for exhausting fluid from the center of said cylinder through said exhaust port, said outlet port having its upper edge inclined to produce a gradual opening by the piston from one side of said port to the other, prior to opening of the intake port.

4. In an internal combustion engine, a power cylinder and a compression cylinder arranged side by side, said cylinders being connected together by an inlet passageway, said passageway communicating with the outer end of the compression cylinder and with the power cylinder intermediate its ends, and a fuel injector arranged in the passageway between said cylinders, said compression cylinder terminating short of the outer end of the power cylinder, spring pressed air inlet valves normally closing the outer end of the compression cylinder, a hot air collecting hood housing said outer end of the compression cylinder and engaging a part of the power cylinder, and a perforated cone disposed centrally in said hood and having its flared inner end received over the air inlet valves.

In testimony that I claim the foregoing I have hereunto set my hand at Milwaukee, in the county of Milwaukee and State of Wisconsin.

CARL F. HIGH.